Aug. 16, 1955  E. F. WEGNER, SR  2,715,503
FISHING REEL

Filed April 24, 1952  2 Sheets-Sheet 1

Edward F. Wegner, Sr.
INVENTOR.

BY
Attorneys

Aug. 16, 1955    E. F. WEGNER, SR    2,715,503
FISHING REEL
Filed April 24, 1952    2 Sheets-Sheet 2
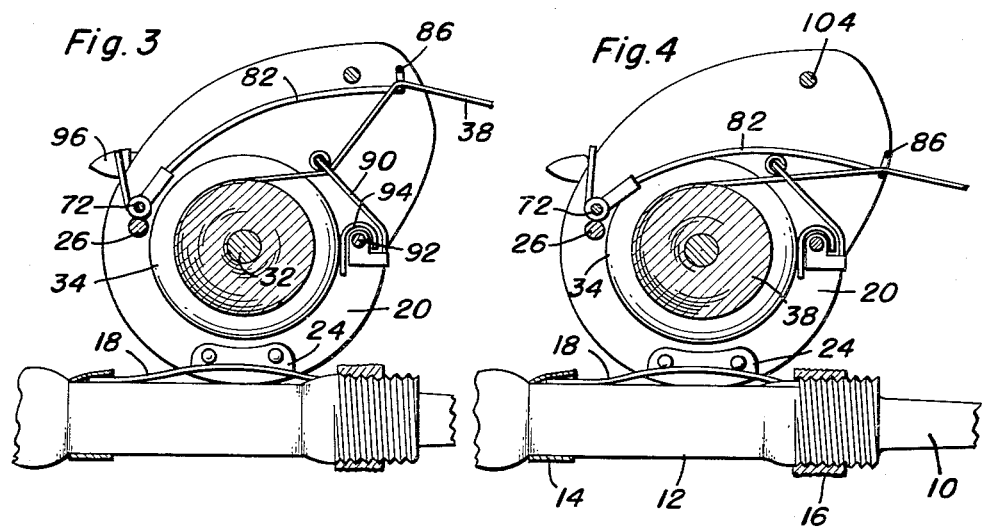
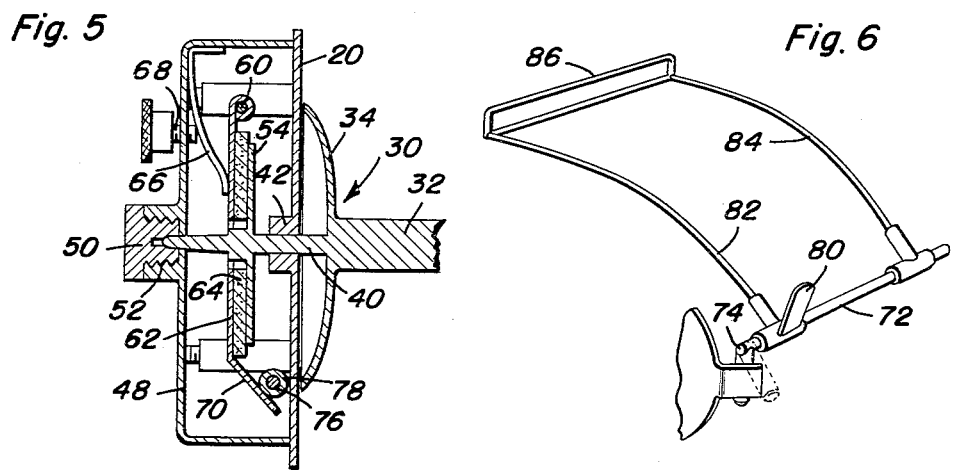
Edward F. Wegner, Sr.
INVENTOR.
BY *Clarence A. O'Brien*
*and Harvey B. Jackson*
Attorneys

United States Patent Office 2,715,503
Patented Aug. 16, 1955

2,715,503
FISHING REEL

Edward F. Wegner, Sr., Council Bluffs, Iowa
Application April 24, 1952, Serial No. 284,054
4 Claims. (Cl. 242—84.5)

This invention relates to a fishing reel and particularly to a brake control arrangement for preventing back lash on a reel.

In fishing operations it is customary to carry the line on a reel and to cast the bait causing the line to pay out. This frequently results in putting the spool of the reel in high motion so that the inertia of the reel tends to pay out the line after the bait has substantially ceased to require more line. Extra line paid off the reel is therefore not drawn out and is frequently wound into an aggravating tangle, commonly called a back lash. Anglers commonly tend to prevent back lash by using their thumb as a brake on the reel but obviously the application of the braking thumb too soon will decrease the length of the cast or produce other undesirable effects therein. Likewise, it is apparent that too late an application of the brake or insufficient application will result in the undesired back lash.

The present invention provides a mechanical brake for controlling the paying out of the line and has a lever actuated device for operating to release the brake and a line tension lever responsive to the paying out of the line for controlling the braking arrangement.

In carrying the invention into practice a line engaging lever is rigidly attached to an actuating shaft which is mounted in the frame of a reel and which operates a cam control arm for lifting the brake in and out of engagement with the brake disk attached to the pool.

Accordingly, it is a prime object of the invention to provide an improved fishing reel.

It is further object of the invention to provide a brake control fishing reel.

It is a further object of the invention to provide automatic means for controlling the brake on a fishing reel.

It is a further object of the invention to provide a lever responsive to the paying out of the line for controlling the brake on a fishing reel.

It is a further object of the invention to provide a means for controlling the brake pressure on a fishing reel.

It is still a further object of the invention to provide a fishing reel having extending cheek plates for protecting the brake applying apparatus.

Other objects and many of the attendant advantages of this invention will be apparent from the following detailed description taken in conjunction with the accompanying drawing in which:

Figure 3 is a cross-section through the reel taken substantially on the line 3—3 of Figure 1 and showing the brake control lever in brake applying position;

Figure 4 is a view similar to Figure 3 but showing the brake applying lever in depressed or brake relieving position;

Figure 5 is a sectional view taken substantially on the plane indicated by the line 5—5 of Figure 1 and showing the improved brake arrangement according to the present invention; and Figure 6 is a perspective view of the actuating means for controlling the brake application.

Figure 1:
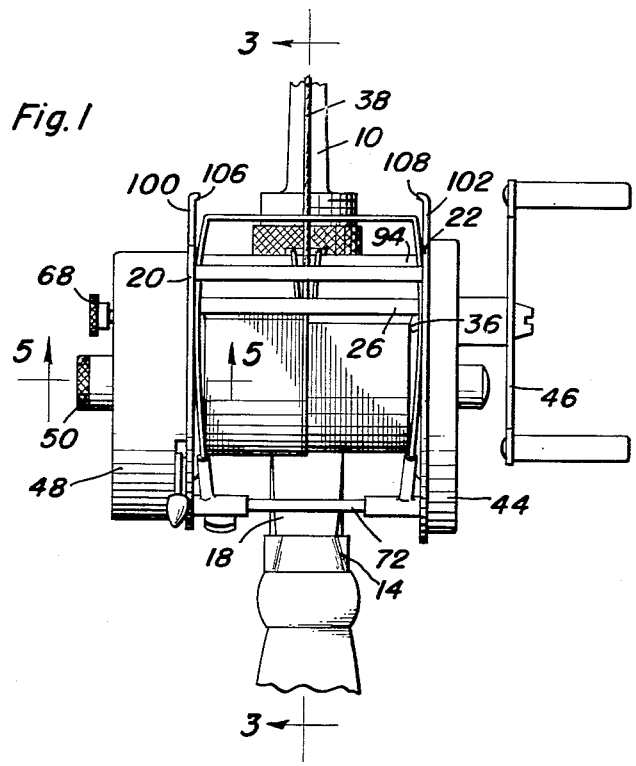
Figure 1 is a top plan view of a fishing reel embodying the invention.
Figure 2:
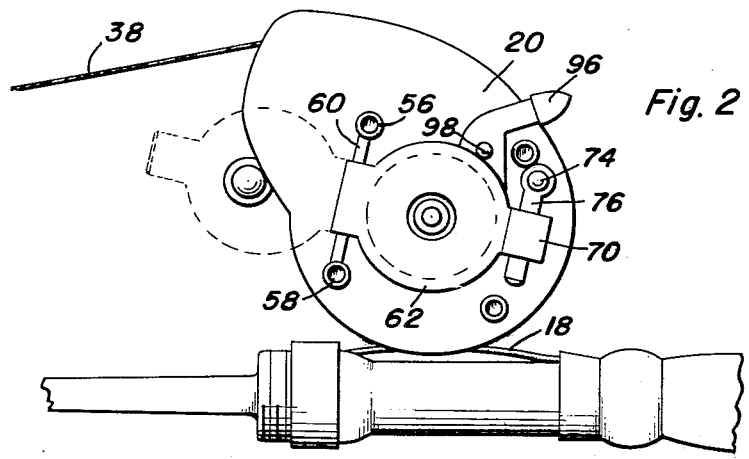
Figure 2 is a left side elevation of the reel with the cover removed.

In the exemplary embodiment of the invention a fishing rod 10 is provided with a reel seat 12 having a fixed ferrule 14 and a locking ferrule 16 engaging a mounting plate 18 which is rigidly connected to a frame including the end plates or cheek plates 20 and 22 by means of the rigid bracket 24.

The end plates or cheek plates 20 and 22 are held in permanently spaced relation by means of cross pillars 26. The spool 30 having a central hub 32 and end plates 34 and 36 is adapted to receive a coil of fishing line 38. The spool 30 is provided with axial shafts 40 received in bearings 42 in the cheek plates 20 and 22. The spool is provided with a driving mechanism, not shown, housed within a housing end plate 44 and driven by means of a handle 46. The opposite end of the spool from the housing 44 is provided with a housing 48 connected to the cheek plate 20 and the shaft 40 extends into a thrust bearing 50 which can be tightened by means of screw threads 52 to correct end play of the spool in the frame.

Control of the spool is obtained by means of a brake disk 54 rigidly fixed on the shaft 40 so that it is turned by and with the spool 30. Hinge posts 56 and 58 are mounted on the end plate 20 and the hinge pin 60 is mounted on the posts 56 and 58 and a brake shoe 62 is hingedly connected to the hinge pin 60. The brake shoe 62 is provided with a brake lining 64 which can be pressed into frictional engagement with the surface of the disk 54. A resilient element in the form of a leaf spring 56 is rigidly connected by any suitable means to the cover 48 and the tension is controlled by a screw 68 threadedly engaging the casing 48. A cam 70 is rigidly attached to and preferably integral with the brake shoe 62 and extends diagonally with respect thereto for a purpose presently to be described.

An actuating shaft 72 is journaled in the end plates 20 and 22 and has an end 74 extending through the plate 20 and shielded inside the housing 48. A cam follower arm 76 is rigidly mounted on the shaft 72 and engages the cam 76 preferably through means of a roller 78. A thumb control lever 80 is rigidly mounted on the shaft 72 so that the shaft 72 may be oscillated by means of manual engagement of the thumb lever 80. A pair of operating levers 82 and 84 are rigidly connected to the shaft 72 and extend over and beyond the spool 30 and have the outer ends thereof joined by a bridle 86 through which the line 38 is entrained.

Preferably the reel is provided with a level wind attachment having a bridle 90 which is traversed along a shaft 92 in a guide 94 by means well known in the art.

As is customary in the art a click device or audible signal is connected to be driven by the spool 30 a click control lever 96 is pivoted on a pin 98 on the cheek plate 20 and extends outwardly therefrom in the vicinity of the thumb lever 80 so as to be readily available to the thumb of the fisherman.

The cheek plates 20 and 22 have extending portions 100 and 102 which extend laterally along the path of motion of the levers 82 and 84 so that the levers are protected from lateral interference or from injury because of obstructions near them. A cross pillar 104 is placed in the cheek plates 100 and 102 to rigidify the structure and to limit upward movements of the levers 82 and 84. Preferably the cheek plates 100 and 102 are provided with inturned edges 106 and 108 to further stiffen and reenforce the same. In the operation of the reel according to the invention the angler will have the line 38 wound on the spool 30 and extending through the bridle 90 and the bridle 86. The pole 10 will then move through a sling throwing motion so that weight or bait on the end of the line 38 will be propelled outwardly from the angler and the line 38 will rapidly be stripped from the spool 30. Tension on the line 38 will depress the bridle 86 and thereby depress the levers 82 and 84 so that the actuating rod 72 is oscillated about its journal points in the plates 20 and 22 so that the cam follower arm 76 will contact the cam 70 and lift the brake shoe 62 out of frictional engagement with the plate or disk 54 against the tension of the spring 66. As long as there is momentum in the bait or weight at the end of the line there will be sufficient pressure to depress the bridle 86 and maintain the brake in substantially non-operative position. However, as soon as the forward motion of the bait ceases the line will cease to have sufficient pressure to hold down the bridle 86 with the result that the shaft 72 will oscillate to relieve the pressure against the cam 70 so that the brake shoe 62 will be forced against the disk 54 by the spring 66 to retard the motion of the spool 30. The actual tension or friction between the plates 62 and 54 will be determined by the nature of the brake block 64 and the tension on the spring 66 as established by the screw 68.

It will thus be apparent that the tension on the brake shoe will be determined by the condition of the line flowing from the reel so that as soon as the tension on the line is decreased the brake will be operative to snub the spool and prevent an overflow or back lash in the line. It will further be apparent that by means of the thumb lever 80 the angler may select the brake pressure as desired during the casting operation.

For purpose of exemplification a particular embodiment of the invention has been shown, and described according to the best present understanding thereof. It will be apparent to those skilled in the art that many changes and modifications can be made therein without departing from the true spirit of the invention.

Having described the invention, what is claimed as new is:

1. An anti-backlash reel comprising a frame, a line receiving spool journaled in said frame, a brake disk connected to said spool, a hinge mounted on said frame, a brake shoe mounted on said hinge, a block of friction material mounted on said shoe, a resilient member yieldingly urging said block of friction material into frictional engagement with the lateral surface of said brake disk, an actuating shaft journaled in said frame, an arm rigidly mounted on said shaft, a cam surface connected with said brake shoe, said arm engaging said cam surface, a lever rigidly connected to said shaft, said lever being operable to oscillate said shaft whereby said arm actuates said cam to urge said brake shoe out of engagement with said brake disk, bridle supporting members rigidly mounted on said actuating shaft, a line engaging bridle rigidly mounted on said supporting members, said supporting members extending above and forwardly of said spool, cheek plates adjacent each end of said spool, forwardly extending projections on said cheek plates extending forward to guard the said bridle, a stop member mounted in said cheek plates, said stop member limiting the oscillatory movement of said actuating shaft.

2. An anti-backlash reel comprising a frame including spaced apart cheek plates, a line receiving spool journaled between said cheek plates, an axial shaft on said spool, said axial shaft extending through one of said cheek plates, a brake disk fixed on said axial shaft, a hinge mounted on said frame, an annular plate-like brake shoe mounted on said hinge, said axial shaft extending through said annular brake shoe, a resilient member yieldingly urging said another brake shoe into frictional contact with the face of said brake disk, an actuating shaft journaled in said cheek plates and disposed rearwardly of and substantially parallel with respect to said spool, an angularly disposed arm rigidly mounted on said actuating shaft, a cam member rigidly mounted on said brake shoe and extending in proximity with said arm, an actuating lever rigidly mounted on said actuating shaft, said lever being operable to oscillate said actuating shaft whereby said arm engages said cam to urge said brake shoe out of contact with said brake disk, bridle supporting members rigidly mounted on said actuating shaft, a line engaging bridle rigidly mounted on said supporting members, said bridle supporting members being curved and extending over and terminating forwardly of said spool.

3. An anti-backlash reel comprising a frame including spaced apart cheek plate, a line receiving spool journaled between said cheek plates, an axial shaft on said spool, said axial shaft extending through one of said cheek plates, a brake disk fixed on said axial shaft, a hinge mounted on said frame, an annular platelike brake shoe mounted on said hinge, said axial shaft extending through said annular brake shoe, a resilient member yieldingly urging said annular brake shoe into frictional contact with the face of said brake disk, an actuating shaft journaled in said cheek plates and disposed rearwardly of and substantially parallel with respect to said spool, an angularly disposed arm rigidly mounted on said actuating shaft, a cam member rigidly mounted on said brake shoe and extending in proximity with said arm, an actuating lever rigidly mounted on said actuating shaft, said lever being operable to oscillate said actuating shaft whereby said arm engages said cam to urge said brake shoe out of contact with said brake disk, bridle supporting members rigidly mounted on said actuating shaft, a line engaging bridle rigidly mounted on said supporting members, said bridle supporting members being curved and extending over and terminating forwardly of said spool, forwardly extending projections on said cheek plates, said bridle supporting members extending between said projections, a line guide bridle mounted on said frame, said actuating shaft being operable to move said line engaging bridle into and out of alignment with said line guide bridle, said arm being moved to release said brake shoe from said brake disk when said line engaging bridle is in alignment with said line guide bridle.

4. An anti-backlash reel comprising a frame, a line receiving spool journaled in said frame, a brake disk operatively connected to said spool, a hinge mounted on said frame, a brake shoe plate mounted on said hinge, said brake shoe plate extending in substantially parallel relation with the surface of said brake disk, a resilient member yieldingly urging said brake shoe plate into frictional engagement with said brake disk, an actuating shaft journaled in said frame, an arm rigidly mounted on said shaft, a roller journaled on said arm, a cam member rigidly mounted on said brake shoe plate, said roller engaging said cam, a lever rigidly connected to said shaft, said lever being operable to oscillate said shaft, whereby said arm actuates said cam to urge said brake shoe plate out of engagement with said brake disk, bridle supporting members rigidly mounted on said actuating shaft, a line engaging bridle rigidly mounted on said bridle supporting members, said bridle supporting members extending over and in front of said spool, cheek plates adjacent each end of said spool, projections on said cheek plates extending forward to guard said bridle, and a stop member mounted in said check plates, said stop member limiting the oscillatory movement of said actuating shaft.

References Cited in the file of this patent

UNITED STATES PATENTS

| 730,457 | Howe | June 9, 1903 |
| 843,514 | Baumgartel | Feb. 5, 1907 |
| 1,554,133 | Schmid | Sept. 15, 1925 |
| 1,888,087 | Jacobsen | Nov. 15, 1932 |
| 1,892,541 | Smelser | Dec. 27, 1932 |
| 2,190,984 | Gulbrandsen | Feb. 20, 1940 |
| 2,331,249 | Treadway | Oct. 5, 1943 |
| 2,374,551 | Margis, Jr. | Apr. 24, 1945 |
| 2,409,154 | Schafer | Oct. 8, 1946 |
| 2,547,282 | Plouff | Apr. 3, 1951 |
| 2,553,589 | Hull et al. | May 22, 1951 |
| 2,622,824 | Perinoni et al. | Dec. 23, 1952 |
| 2,623,705 | Whittington | Dec. 30, 1952 |